May 31, 1960 — L. VELLUZ ET AL — 2,938,891
METHOD OF MAKING OXYTOCIN AND INTERMEDIATES THEREOF
Filed March 29, 1957 — 5 Sheets-Sheet 1

INVENTORS.
L. Velluz, G. Amiard, J. Bartos,
B. Goffinet & R. Heymes

May 31, 1960 L. VELLUZ ET AL 2,938,891
METHOD OF MAKING OXYTOCIN AND INTERMEDIATES THEREOF
Filed March 29, 1957 5 Sheets-Sheet 3

FIG. 3.

INVENTORS.
L. Velluz, G. Amiard, J. Bartos,
B. Goffinet & R. Heymes

CONTINUE FIG. 4

May 31, 1960 L. VELLUZ ET AL 2,938,891
METHOD OF MAKING OXYTOCIN AND INTERMEDIATES THEREOF
Filed March 29, 1957 5 Sheets-Sheet 5

Fig. 5.

OXYTOCIN OF DU VIGNEAUD

INVENTORS.
L. Velluz, G. Amiard, J. Bartos,
B. Goffinet & R. Heymes
BY Fred O. Klein
Joseph F. Padlon
Their Attorneys

United States Patent Office 2,938,891
Patented May 31, 1960

2,938,891

METHOD OF MAKING OXYTOCIN AND INTERMEDIATES THEREOF

Leon Velluz, Paris, Gaston Amiard, Noisy-le-Sec, Jaroslav Bartos and Bernard Goffinet, Paris, and René Heymes, Romainville, France, assignors to Uclaf, Paris, France, a corporation of France Filed Mar. 29, 1957, Ser. No. 649,520

Claims priority, application France Mar. 30, 1956

12 Claims. (Cl. 260—112)

The present invention relates to a new method of preparing oxytocin, a nonapeptide hormone, which, according to du Vigneaud et al. (J. Am. Chem. Soc., 1954, 76, 3115), has the following structure:

Expressed differently, oxytocin may be defined as

L—cysteinyl L—tyrosyl L—isoleucyl L—glutaminyl L—asparaginyl L—cysteinyl L—prolyl L—leucyl glycinamide
|_S————————————————————————————————————————————S_| wherein the two cysteine groups are present in the form of cystine.

According to the present invention, the preparation of this synthetic nonapeptide hormone comprises the separate preparation of a dipeptide, (N-trityl γ-methyl L-glutamyl) β-methyl L-aspartic acid, of a tripeptide, (S,N-ditrityl L-cysteinyl) L-tyrosyl L-isoleucine, and of a tetrapeptide, (S-trityl L-cysteinyl) L-prolyl L-leucyl methyl glycinate. The condensation of the dipeptide with the tetrapeptide in the presence of dicyclohexylcarbodiimide produces, after selective detritylation at the nitrogen, a hexapeptide, (γ-methyl L-glutamyl) (β-methyl L-aspartyl) (S-trityl L-cysteinyl) L-prolyl L-leucyl methyl glycinate. The condensation of the tripeptide with the hexapeptide finally produces a nonapeptide derivative, (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate which, after conversion of the ester groups into amides, detritylation and oxidation, exhibits the physiological effects of the oxytocin according to du Vigneaud.

The synthesis according to the present invention follows a course which differs from the scheme established by du Vigneaud (V. du Vigneaud, C. Ressler, J. M. Swan, C. W. Roberts and P. G. Katsoyannis, J. Am. Chem. Soc., 1954, 76, 3115), and later by Boissonas (R. A. Boissonas, St. Guttmann, P. A. Jaquenoud and J. P. Waller, Helv. Chim. Acta, 1955, 38, 1491) and which may be illustrated as follows:

The characteristic feature of the present invention is the use of N-tritylated or S,N-ditritylated derivatives as new intermediate compounds, and the use of dicyclohexylcarbodiimide as condensing agent. It is one of the advantages of the new process that, in using either sulfur or nitrogen tritylation as the sole blocking means, compounds are employed that are readily obtained and easily split, selectively if necessary, by means of simple reagents while utilizing available equipment. The great simplicity of the herein-claimed process, which consists of a plurality of identical steps and produces excellent yields, makes it particularly suitable for commercial production and renders it superior to prior methods. Moreover, there is an almost quantitative recovery of the blocking agent in the form of triphenylcarbinol.

It is, therefore, the principal object of the present invention to provide a new method of preparing oxytocin.

It is another object of the invention to provide methods of preparing certain polypeptides such as a di-, tri-, tetra- and nona-peptide as intermediates of oxytocin, as well as a method of converting the nonapeptide into oxytocin.

It is a still further object of the invention to provide such polypeptides as new commercial products.

Figure 1:
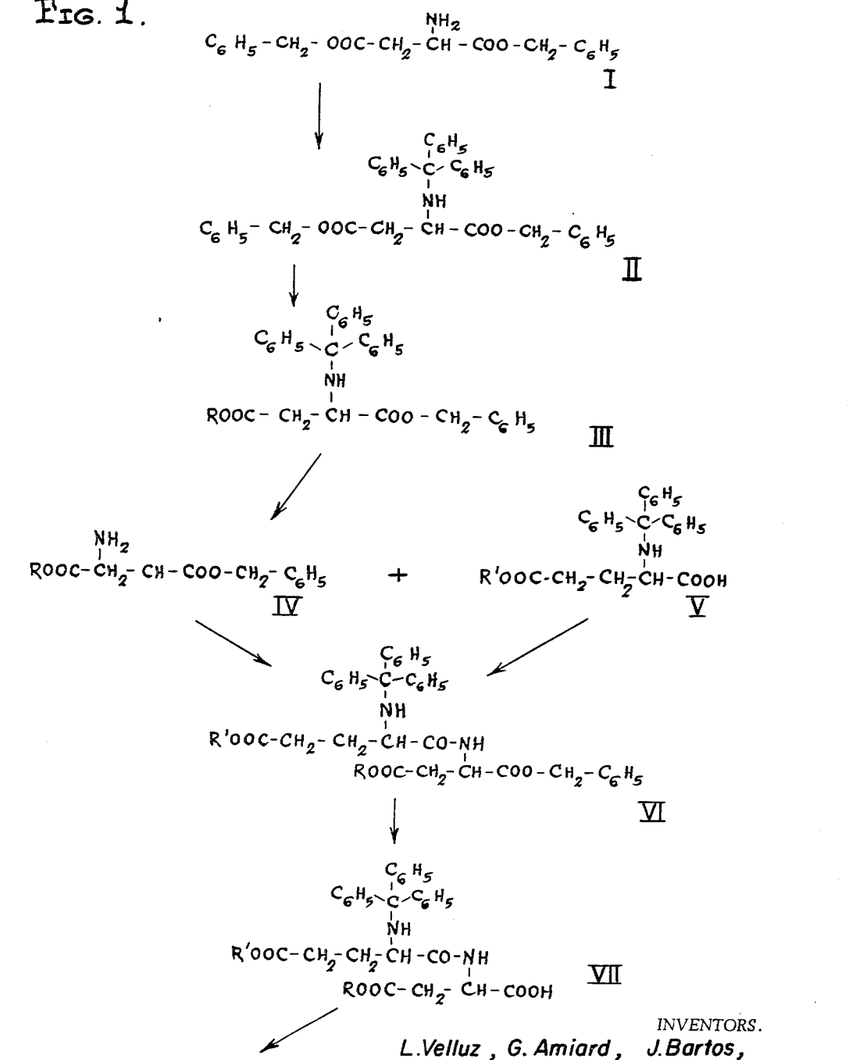
Figure 2:
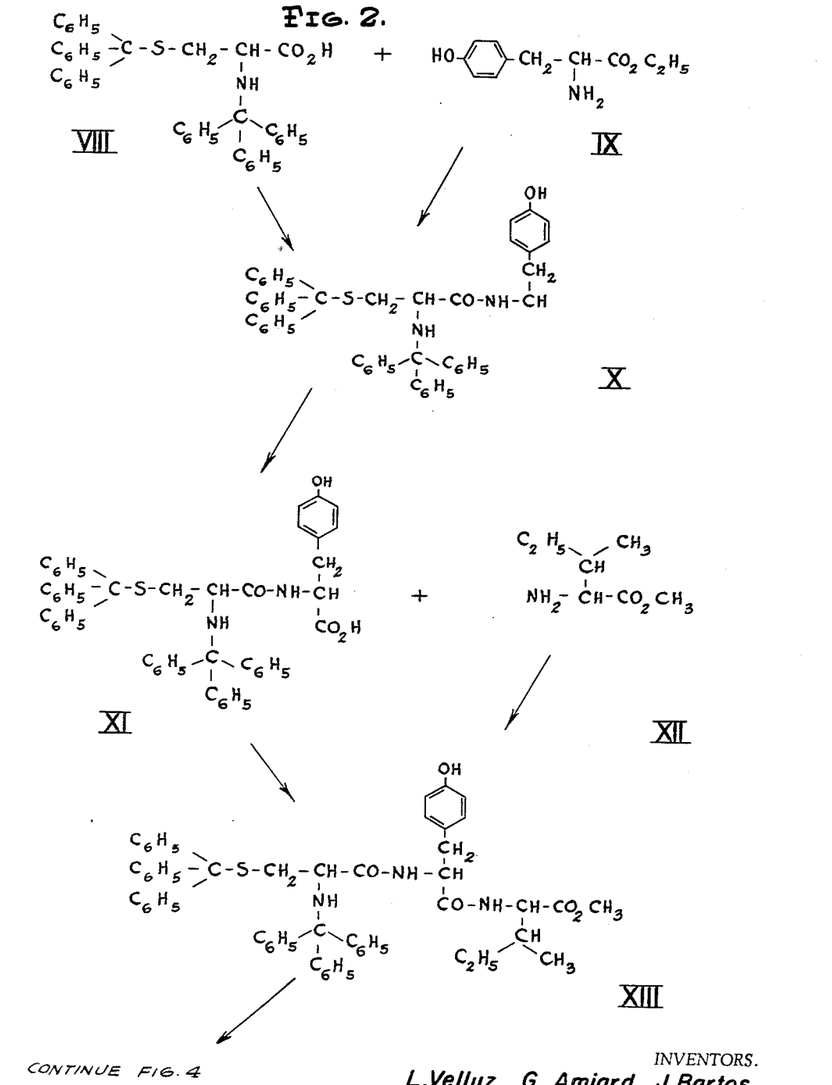
Figure 3:
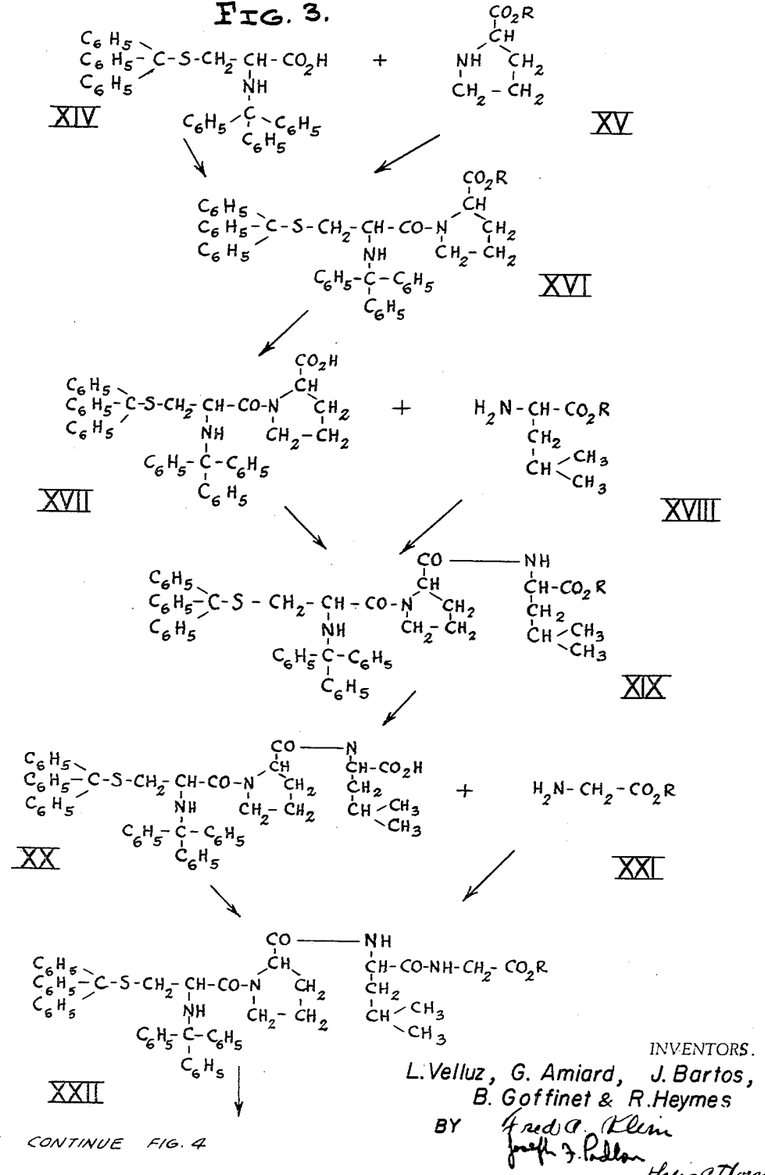
Figure 4:
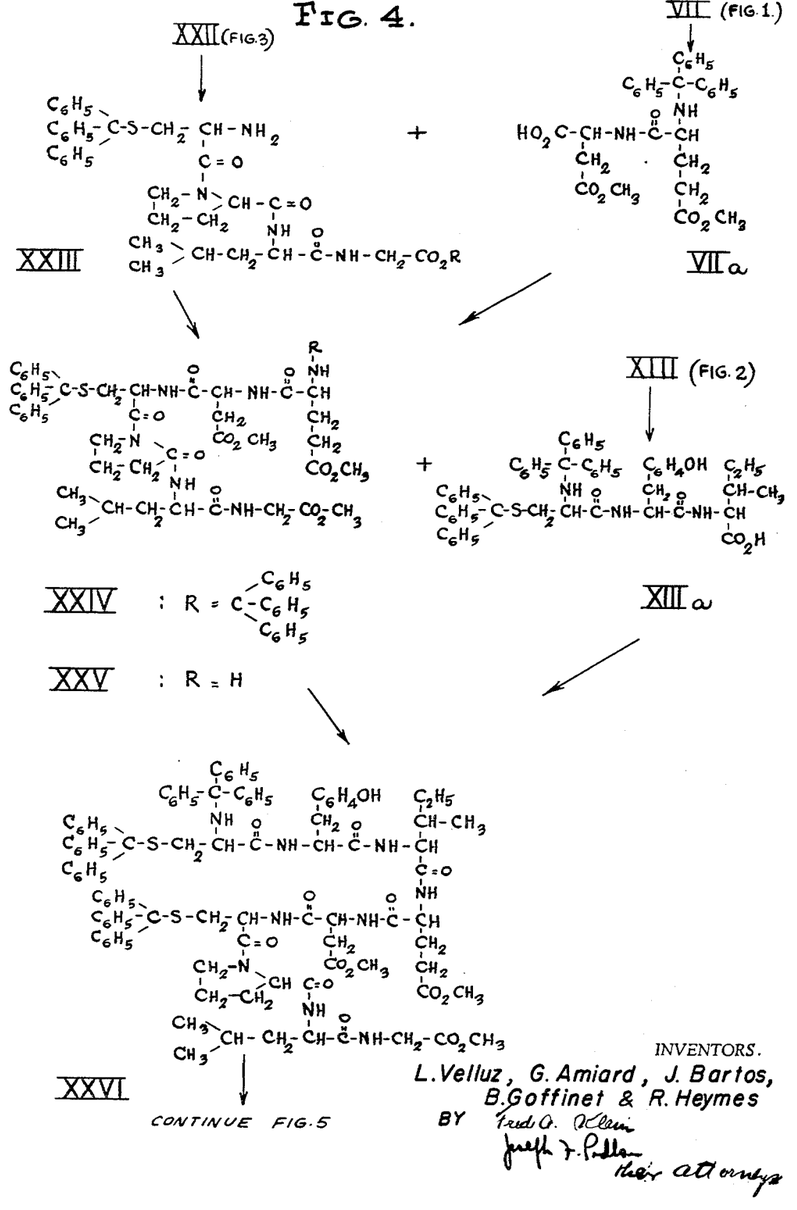
Figure 5:
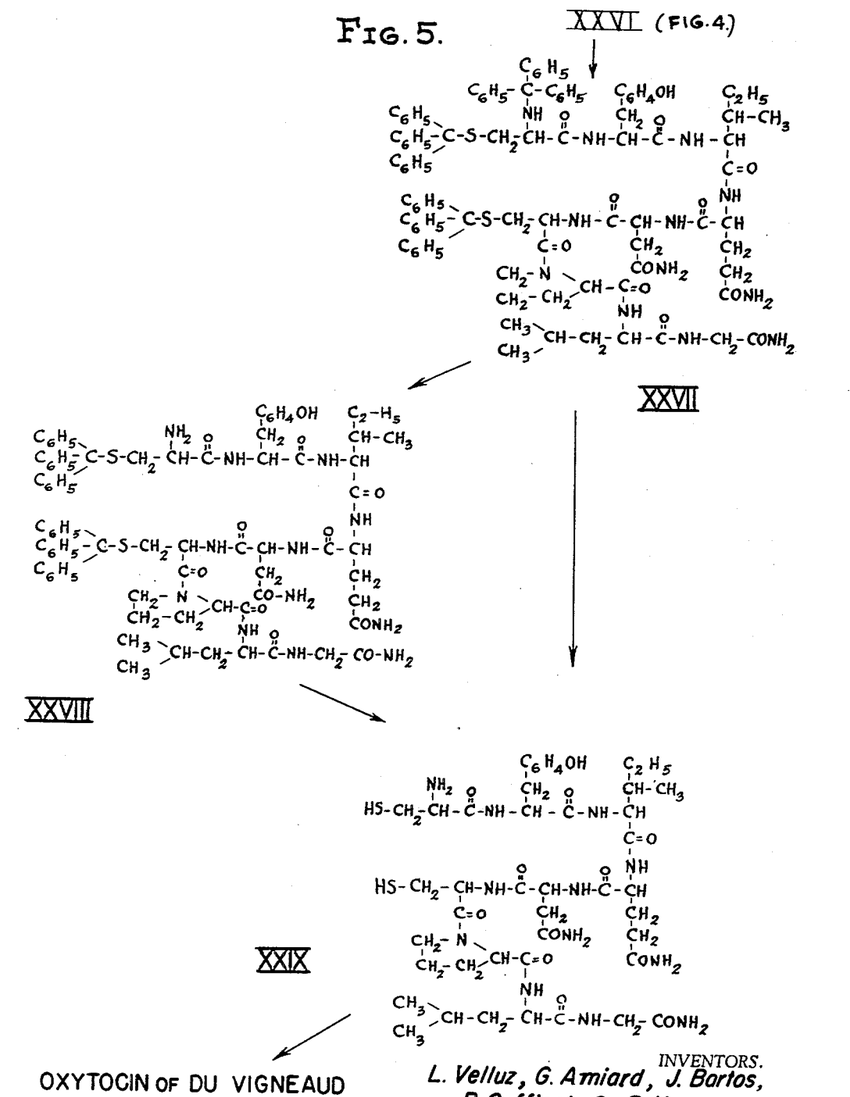

These and other objects and advantages of the invention will appear from the herein following detailed description when read in conjunction with the attached diagrammatic presentation of the procedure (Figs. 1 to 5).

*First stage.*—Preparation of the diethylamine salt of N-trityl γ-methyl L-glutamyl β-methyl L-aspartic acid.

According to the herein-claimed process, a γ-alkyl N-trityl L-glutamate, V, is caused to react with an α-benzyl β-alkyl L-aspartate, IV, in the presence of N,N'-dicyclohexylcarbodiimide, and the resulting (N-trityl γ-alkyl) glutamyl α-benzyl β-alkyl aspartate, VI, is subjected to hydrogenolysis. This produces the desired (N-trityl γ-alkyl) glutamyl β-alkyl aspartate, VII, which furnishes the dipeptide bond of the middle portion of oxytocin.

The preparation of the α-benzyl β-alkyl L-aspartates, representing compounds which have not been described in the past, constitutes one of the novel features of the herein-disclosed process. We found that N-trityl dibenzyl aspartate, II, will undergo preferential alcoholysis at the β-position, in the presence of an alkali metal alcoholate, provided the process is carried out in the presence of a co-solvent such as dioxane and at a temperature ranging between 10 and 25° C., whereas ordinary alcoholysis produces a dialkyl ester by the simultaneous substitution of the two benzyls. Upon simply detritylating the mixed ester III by means of hot acetic acid, hydrochloric acetone or gaseous hydrochloric acid in chloroform, the mixed aspartate, IV, is obtained.

The preparation of an N-trityl γ-alkyl L-glutamate by preferential hydrogenolysis of a mixed diester of N-trityl glutamic acid has been described in the co-pending application entitled "Method of Preparing L(+)-Glutamine," Serial No. 594,117, filed June 27, 1956.

This method permits the preparation of an N-trityl γ-alkyl glutamyl β-alkyl aspartate by means of a succession of operations that are easily carried out. Moreover, contrary to protection by means of tosylation, the use of sodium in liquid ammonia is not required in order to eliminate any trityl which protects the amine group of the glutamic acid.

*Second stage.*—Preparation of S,N-ditrityl L-cysteinyl L-tyrosyl L-isoleucine.

This process step comprises dissolving, in a suitable solvent, a salt of a tyrosine ester, IX, and a salt of S,N-ditrityl L-cysteine, VIII, in the presence of a slight excess of dicyclohexylcarbodiimide, destroying excess dicyclohexylcarbodiimide after the reaction, isolating the resulting dipeptide ester, X, saponifying the latter and condensing XI in the same manner with an L-isoleucine ester, XII.

According to a preferred method of the invention, S,N-ditrityl L-cysteine diethylamine, ethyl L-tyrosine hydrochloride and an excess of about 10% of dicyclohexylcarbodiimide are dissolved in methylene chloride and excess dicyclohexylcarbodiimide is destroyed after reacting by adding acetic acid. S,N-ditrityl L-cysteinyl ethyl L-tyrosinate is isolated, saponified by refluxing with potassium hydroxide in methanol, to form S,N-ditrityl L-cysteinyl L-tyrosine triethylamine which is reacted with methyl L-isoleucinate in the presence of dicyclohexylcarbodiimide in methylene chloride as previously set forth, to produce, after the necessary steps, S,N-ditrityl L-cysteinyl L-tyrosyl methyl L-isoleucinate which, in turn, by means of saponification with potassium hydroxide in methanol, is converted into S,N-ditrityl L-cysteinyl L-tyrosyl L-isoleucine.

*Third stage.*—Preparation of S-trityl L-cysteinyl L-prolyl L-leucyl methyl glycine hydrochloride.

This process step permits the production of the tetrapeptide ester, XXIII, in 6 stages which are readily carried out while blocking only once; moreover, the final derivative has the added advantage of splitting more readily than, say, the S-benzylated compounds that have been used in the past in order to block sulfur, whereby, in order to reestablish the free mercaptan group, treatment with sodium in liquid ammonia is required.

According to our method, S,N-ditrityl L-cystein, XIV, is condensed with an L-proline ester, XV, in the presence of N,N'-dicyclohexylcarbodiimide. This produces an S,N-ditrityl L-cysteinyl L-proline ester, XVI, which, upon saponification, forms S,N-ditrityl L-cysteinyl L-proline, XVII. A further condensation of compound XVII with an L-leucine ester, XVIII, according to the previously described method, produces the respective S,N-ditrityl L-cysteinyl L-prolyl L-leucine ester, XIX, which, by means of saponification, is converted into S,N-ditrityl L-cysteinyl L-prolyl L-leucine, XX. This tripeptide XX is reacted with a glycine ester, XXI, in the presence of dicyclohexylcarbodiimide to produce the corresponding S,N-ditrityl L-cysteinyl L-propyl L-leucyl glycine ester, XXII. Treatment thereof with hot aqueous acetic acid or with an acetone solution of aqueous hydrochloric acid ultimately produces the desired S-trityl L-cysteinyl L-prolyl L-leucyl glycine ester, XXIII.

*Fourth stage.*—Preparation of S,N-ditrityl L-cysteinyl L-tyrosyl L-isoleucyl γ-methyl L-glutamyl β-methyl L-aspartyl S-trityl L-cysteinyl L-prolyl L-leucyl methyl glycinate.

This step consists in dissolving, in a suitable solvent, a salt of (N-trityl γ-alkyl L-glutamyl) β-alkyl L-aspartic acid, VII, and a salt of an ester of (S-trityl L-cysteinyl) L-prolyl L-leucyl glycine, XXIII, in the presence of a slight excess of dicyclohexylcarbodiimide, destroying the dicyclohexylcarbodiimide after the reaction, isolating the hexapeptide ester, XXIV, produced in this manner, detritylating the latter selectively at the nitrogen by treating with aqueous acetic acid or acetone in aqueous hydrochloric acid, condensing the product in the afore-stated manner with a salt of (S,N-ditrityl L-cysteinyl) L-tyrosyl L-isoleucine, XIII, in the presence of dicyclohexylcarbodiimide and isolating the nonapeptide, XXVI, which is thereby obtained.

According to a preferred mode of operation, the diethylamine salt of (N-trityl γ-methyl L-glutamyl) β-alkyl L-aspartic acid, VII, and the hydrochloride of (S-trityl L-cysteinyl) L-prolyl L-leucyl methyl glycinate, XXIII, are dissolved in methylene chloride, a 10 to 30% excess of dicyclohexylcarbodiimide is added, excess dicyclohexylcarbodiimide is destroyed after reaction by washing with diluted hydrochloric acid, the solution is filtered and evaporated to dryness, and (N-trityl γ-methyl L-glutamyl) (β-alkyl L-aspartyl) (S-trityl L-cysteinyl) L-prolyl L-leucyl methyl glycinate, XXIV, is isolated. This hexapeptide ester is dissolved in acetone in hydrochloric acid, the hydrochloride of (γ-methyl L-glutamyl) (β-alkyl L-aspartyl) (S-trityl L-cysteinyl) L-prolyl L-leucyl methyl glycinate, XXV, is isolated and then condensed, in methylene chloride and in the presence of dicyclohexylcarbodiimide, with the diethylamine salt of (S,N-ditrityl L-cysteinyl) L-tyrosyl L-isoleucine, XIII, in the manner of the foregoing condensation, resulting in the nonapeptide, XXVI.

*Fifth stage.*—Ammoniolysis, detritylation and oxidation of S,N-ditrityl L-cysteinyl L-tyrosyl L-isoleucyl γ-methyl L-glutamyl β-methyl L-aspartyl S-trityl L-cysteinyl L-prolyl L-leucyl methyl glycinate.

As illustrated by the attached diagram, this process step includes treating (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate, XXVI, with ammonia, in the presence or absence of a solvent. The (S,N-ditrityl L-cysteinyl) L-tyrosyl L-isoleucyl L-glutaminyl L-asparaginyl (S-trityl L-cysteinyl) L-prolyl L-leucyl glycinamide, obtained thereby, is isolated and a solution thereof treated, in the presence or absence of water and a catalyst, with an acidic agent. L-cysteinyl L-tyrosyl L-isoleucyl L-glutaminyl L-asparaginyl L-cysteinyl L-prolyl L-leucyl glycinamide, XXIX, is isolated and oxidized in aqueous solution and according to known methods (cf. R. R. Sealock and V. du Vigneaud, J. Pharmacol. Exp. Therap., 1935, 54, 433, and S. Gordon and V. du Vigneaud, Proc. Soc. Exp. biol. Med., 1953, 84, 723) by means of oxygen in order to produce the nonapeptide hormonal compound A, having oxytocic activity. According to another preferred mode of operation, (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate, XXVI, is treated, dissolved in a lower alcohol having 1 to 3 carbon atoms or in an aqueous solution of such an alcohol at room temperature with ammonia, and (S,N-ditrityl L-cysteinyl) L-tyrosyl L-isoleucyl L-glutaminyl L-asparaginyl (S-trityl L-cysteinyl) L-prolyl L-leucyl glycinamide, XXVII, is isolated by crystallization. This last treatment may be also effected in liquid ammonia. The isolated compound, XXVII, dissolved for example in a halogenated solvent such as chloroform or methylene chloride, and in the presence or absence of an organic acid such as acetic acid, is subjected to the action of an acidic agent such as gaseous hydrochloric acid. The process is carried out at a temperature between 0° C. and the reflux temperature of the solvent used, preferably close to room temperature, in the presence or absence of water and a catalyst, such as thioglycolic acid. Upon completion of the reaction, the precipitate constituting a salt, such as the hydrochloride salt, is separated, dissolved in water, and the aqueous solution stirred with an ion exchanging resin such as Amberlite IR4B until a pH between 6 and 7 is obtained. This produces a solution which can be directly oxidized, according to known methods, in order to obtain the nonapeptide hormonal compound A having oxytocic properties. However, the above-mentioned detritylation may be also carried out in two stages, the first one consisting in dissolving the (S,N-ditrityl L-cysteinyl) L-tyrosyl L-isoleucyl L-glutaminyl L-asparaginyl (S-trityl L-cysteinyl) L-prolyl L-leucyl glycinamide, XXVII, in acetic acid, treating with hydrochloric acid and isolating (S-trityl L-cysteinyl) L-tyrosyl L-isoleucyl L-glutaminyl L-asparaginyl (S-trityl L-cysteinyl) L-prolyl L-leucyl glycinamide, XXVIII. Detritylation of XXVIII at the sulfur is then carried out, according to the second stage, by following the process indicated above for complete detritylation.

According to a still further modification of the invention, (S,N-ditrityl L-cysteinyl) L-tyrosyl L-isoleucyl ($\gamma$-methyl L-glutamyl) ($\beta$-methyl L-aspartyl) (S-trityl L-cysteinyl) L-prolyl L-leucyl methyl glycinate, XXVI, is completely detritylated, as described above for the intermediate products, XXVII, and XXVIII, and the nonapeptide triester obtained thereby, is oxidized and the cyclic nonapeptide triester is ammoniolyzed to produce the nonapeptide hormone of du Vigneaud.

In the formulas shown in the appended reaction scheme, R,R' represent lower alkyl groups which may or may not be identical.

The melting points set forth in the subsequent examples are instantaneous melting points, determined by means of the Maquenne block.

EXAMPLE 1

*Preparation of dibenzyl aspartate, I*

The hydrochloride of this compound is prepared from the p-toluene sulfonate compound which can be obtained by azeotropic esterification of L-aspartic acid with benzyl alcohol in the presence of p-toluene sulfonic acid.

23.6 g. of L-aspartic acid and 42 g. of monohydrated p-toluene sulfonic acid are dissolved in 160 cc. of hot benzyl alcohol. 300 cc. of carbon tetrachloride are added, and the solution is boiled to distill off a carbon tetrachloride-water mixture while the solvent is replaced as the distillation progresses. After the carbon tetrachloride distillate ceases to be turbid, the solution is evaporated to dryness and the remaining p-toluene sulfonate of dibenzyl L-aspartate is taken up with ether, followed by filtration and drying. The yield is 96 g. (or 99% of the theory), M.P.=154° C., $[\alpha]_D^{20}=+6.25°\pm1$ ($c=2\%$, chloroform).

This is a new compound.

In order to produce the hydrochloride derivative of dibenzyl L-aspartate, the p-toluene sulfonate is stirred with 3 volumes of ice water and one mol of concentrated soda and extracted with ether. The ether solution of the free ester obtained in this manner is dried over magnesium sulfate which is eliminated by filtration. Upon passing a stream of gaseous hydrochloric acid through the anhydrous ether solution, the hydrochloride of dibenzyl L-aspartate crystallizes. Washing with ether, separating and drying produces this compound at an 80% yield based on the aspartic acid. The hydrochloride appears in the form of needles that are soluble in chloroform, water, aqueously diluted acids or alkalis, sparingly soluble in alcohol and acetone insoluble in ether. M.P.=123–124° C., $[\alpha]_D^{20}=-2°\pm1$ ($c=2\%$, chloroform).

*Analysis:*

Calculated: 61.80% C; 5.76% H; 18.29% O; 4.0% N; 10.14% Cl. Found: 61.7% C; 5.8% H; 18.5% O; 4.0% N; 10.3% Cl.

This compound has not been previously described.

EXAMPLE 2

*Preparation of N-trityl dibenzyl L-aspartate, II*

97 g. of p-toluene sulfonate of dibenzyl L-aspartate, produced according to Example 1, are stirred with 2 volumes of chloroform. Sodium hydroxide is added to cause the medium to be slightly alkaline against phenolphthalein. The chloroform layer is decanted, the aqueous layer is extracted with chloroform, and the chloroform extracts are washed with water. The chloroform solution is dried over magnesium sulfate and is then slightly concentrated. After cooling, 30 cc. of triethylamine and 60 g. of trityl chloride are added, and the solution is left standing for several hours. After adding water and decanting, the chloroform solution is washed again with water, dried over sodium sulfate and evaporated to dryness. The residue is crystallized in ethanol. This produces 103 g. of N-trityl dibenzyl L-aspartate II, M.P.=101–102° C. Recrystallization raises the melting point to 104–105° C.

($c=2\%$, chloroform). The product is soluble in acetone, benzene, chloroform and ether, difficultly soluble in alcohol, insoluble in water and aqueously diluted acids and alkalies.

*Analysis.*—$C_{37}H_{33}O_4N=555.64$. Calculated: 79.97% C; 5.99% H; 2.52% N. Found: 80.0% C; 6.0% H; 2.6% N.

This compound has not been previously described.

EXAMPLE 3

*Preparation of N-trityl $\beta$-methyl $\alpha$-benzyl L-aspartate, III*

11.1 g. of N-trityl dibenzyl L-aspartate, described in Example 2, are dissolved in 60 cc. of dioxane; 100 cc. of methanol and 0.8 cc. of a normal sodium methylate solution in methanol are added. After standing at room temperature overnight, sodium methylate is neutralized by adding several drops of acetic acid. The residue remaining after evaporation to dryness represents compound III, which is sufficiently pure to be directly detritylated.

EXAMPLE 4

*Preparation of $\beta$-methyl $\alpha$-benzyl L-aspartate, IV*

Compound III, produced according to Example 3, is taken up with chloroform, and the chloroform solution is saturated with a stream of gaseous hydrochloric acid. Chloroform is evaporated in vacuo, and the hydrochloride of IV, obtained in this manner, is triturated with ether, separated and dried. This produces 5.4 g. of the hydrochloride of the mixed ester IV which is recrystallized in ethyl acetate. The product appears in form of colorless needles, $[\alpha]_D^{20}=-23°\pm1$ ($c=4\%$ water). It is soluble in water, acetone, chloroform, alcohol and diluted acids and alkalies, insoluble in benzene and ether.

*Analysis.*—$C_{12}H_{16}O_4NCl=273.7$. Calculated: 52.65% C; 5.89% H; 23.38% O; 5.12% N; 12.95% Cl. Found: 52.5% C; 5.9% H; 23.9% O; 5.0% N; 13.2% Cl.

EXAMPLE 5

*Preparation of (N-trityl $\gamma$-methyl L-glutamyl) $\beta$-methyl $\alpha$-benzyl L-aspartate, VI*

6 g. of $\beta$-methyl $\alpha$-benzyl L-aspartate hydrochloride are dissolved in 10 cc. of methylene chloride, 2.2 cc. of diethylamine and then 20 cc. of ether are added in order to completely precipitate diethylamine hydrochloride which is separated and washed with ether. The solution of the free ester is evaporated to dryness and taken up with 20 cc. of methylene chloride.

5 g. of dicyclohexylcarbodiimide are added to the ester solution. The solution is then cooled to 0° C., and 8.1 g. of N-trityl monomethyl glutamate are added (Bull. Soc. Chim., 1956, p. 99) while stirring. After standing overnight at room temperature, 1 cc. of acetic acid is added and dicyclohexylurea which thereupon forms is separated and washed with methylene chloride. The methylene chloride solution of the product is first washed with hydrochloric acid, water and sodium bicarbonate and then dried over sodium sulfate, filtered and evaporated to dryness. This produces a quantitative yield of the crude triester, VI.

EXAMPLE 6

*Preparation of (N-trityl γ-methyl L-glutamyl) β-methyl L-aspartate, VIIa*

The triester, VI, produced according to Example 5, is taken up with 50 cc. of 95% alcohol. 2.8 cc. of triethylamine are added and the solution is hydrogenated in the presence of 2 g. of palladium black. After completion of the hydrogenation, the catalyst is filtered off and the filtrate is washed with alcohol and evaporated to dryness. The residue consisting of the crude acid diester, VII, is best purified in form of the diethylamine salt. For this purpose, the crude ester is taken up with ethyl acetone and is freed from triethylamine by washing with water and hydrochloric acid. It is then dried over sodium sulfate and 2 cc. of diethylamine are added. The solution is evaporated to dryness, and ether is added. The diethylamine salt of acid diester, VII, crystallizes. Cooling with ice, separating and washing with ether produces 9.3 g. of dry salt. Concentration of the mother liquor results in a second recovery bringing the total to 9.7 g. or a yield of 80% based on N-trityl γ-monomethyl glutamate. M.P.=130–135° C. (not very distinct), $[\alpha]_D^{20} = 0° \pm 1$ ($c=2\%$, water). This compound, VII, appears in form of prisms including ¼ molecule of water of crystallization. It is soluble in water, acetone, alcohol, chloroform, sparingly soluble in benzene, insoluble in ether.

*Analysis.*—$C_{34}H_{43}O_7N_3$, ¼ $H_2O$=610.20. Calculated: 66.92% C; 7.18% H; 19.01% O; 6.89% N. Found: 66.9% C; 7.1% H; 18.7% O; 6.9% N.

Ammoniolysis followed by detritylation produces glutaminyl asparagine having the characteristics given in the literature (J. M. Swan and V. du Vigneaud, J. Am. Chem. Soc., 1954, 76, 3110).

EXAMPLE 7

*Preparation of (S,N-ditrityl L-cysteinyl) ethyl L-tyrosinate, X*

(a) PREPARATION OF S,N-DITRITYL DIETHYLAMINE L-CYSTEINATE

The preparation of this compound, which is here briefly repeated, is carried out as follows: 480 cc. of ether and 80 cc. of diethylamine are introduced, together with a stream of nitrogen and while stirring, into a solution of 25 g. of L-cysteine hydrochloride, $[\alpha]_D^{20} = +5.5°$ ($c=1\%$, N-hydrochloric acid) in 480 cc. of water which has been cooled to 0° C. The solution is then cooled to −5° C. and, without interrupting the stirring, 120 g. of trityl chloride are added. The stirring is continued for three hours and, after adding another 200 cc. of chloroform and decanting the aqueous phase, the organic phase is washed with 300 cc. of water and dried over magnesium sulfate. 100 cc. of alcohol containing 1 cc. of diethylamine are added, and the chloroform is removed by distillation. The addition of 100 cc. of ether to the alcohol solution thus obtained and separation produces 55 g. of S,N-ditrityl L-cysteine diethylamine, $$[\alpha]_D^{20} = +71° \pm 1$$

($c=2\%$, chloroform). The mother liquor provides a second yield which brings the total to 70 g.

(b) CONDENSATION OF S,N-DITRITYL DIETHYLAMINE L-CYSTEINATE WITH ETHYL L-TYROSINE HYDROCHLORIDE

A mixture consisting of 20 g. of S,N-ditrityl L-cysteine diethylamine and 7.6 g. of ethyl L-tyrosine hydrochloride is dissolved in 100 cc. of methylene chloride, 6.7 g. of dicyclohexylcarbodiimide dissolved in 20 cc. of methylene chloride are added, the solution is left standing for two hours at room temperature and is then heated for two hours to approximately 35° C. 2 cc. of glacial acetic acid are added and the solution is left standing for thirty minutes at laboratory temperature. It is then filtered, the filtrate washed first with water while adding N-hydrochloric acid until the pH reading is 2, then with plain water, dried over magnesium sulfate and vacuum evaporated to dryness. Upon crystallizing the residue in 30 cc. of ether, 19.6 g. (83%) of S,N-ditrityl L-cysteinyl ethyl L-tyrosinate, X, are obtained, M.P.=135° C., then 183° C. with intermediate resolidification, $$[\alpha]_D^{20} = +77° \pm 1$$

($c=2\%$, chloroform). This product, which has not been previously described, appears in form of small, colorless rectangular prisms, which are soluble in benzene and chloroform, sparingly soluble in alcohol and acetone, difficultly soluble in ether, and insoluble in water.

*Analysis.* — $C_{52}H_{48}O_4N_2S$=796.98. Calculated: 78.36% C; 6.07% H; 3.52% N; 4.02% S; 8.03% O. Found: 78.3% C; 6.0% H; 3.6% N; 4.0% S; 8.2% O.

EXAMPLE 8

*Saponification of (S,N-ditrityl L-cysteinyl) ethyl L-tyrosinate, X*

19 g. of (S,N-ditrityl L-cysteinyl) ethyl L-tyrosinate, X, prepared according to the preceding example, are introduced into 80 cc. of methanol, 16 cc. of 3N potassium hydroxide in methanol and 50 cc. of water are added, and the solution is refluxed for several minutes. After adding 600 cc. of water and, subsequently, 49 cc. of N-hydrochloric acid while vigorously stirring, the solution is three times extracted with each 300 cc. of ether. The ether extracts are combined and washed with water, dried over magnesium sulfate and vacuum evaporated to dryness. The residue is crystallized in 20 cc. of ethanol and produces 14.9 g., or a yield of 82%, of (S,N-ditrityl L-cysteinyl) L-tyrosine, XI, M.P.=146–148° C., $[\alpha]_D^{20} = +87.5° \pm 1$ ($c=2\%$, chloroform). This new compound appears in form of small, colorless rectangular prisms soluble in chloroform, sparingly soluble in alcohol, ether, acetone, benzene, insoluble in water.

*Analysis.*—$C_{50}H_{44}O_4N_2S$=768.93. Calculated: 78.09% C; 5.77% H; 3.64% N; 4.17% S. Found: 78.1% C; 5.8% H; 3.8% N; 4.3% S.

EXAMPLE 9

*Preparation of (S,N-ditrityl L-cysteinyl) L-tyrosyl methyl L-isoleucinate, XIII*

(a) PREPARATION OF (S,N-DITRITYL L-CYSTEINYL) L-TYROSINE TRIETHYLAMINE 2 g. of (S,N-ditrityl L-cysteinyl) L-tyrosine, XI, prepared according to the preceding example, are dissolved in 4 cc. of chloroform, 0.37 cc. of triethylamine and then 25 cc. of petroleum ether (30–75° C.) are added to the solution, which is centrifuged and decanted. Crystallization in ether produces 2.2 g. (97%) of (S,N-ditrityl L-cysteinyl) L-tyrosine tirethylamine, $$[\alpha]_D^{20} = +77° \pm 1$$

($c=2\%$, chloroform).

(b) CONDENSATION OF (S,N-DITRITYL L-CYLTEINYL) L-TYROSINE TRIETHYLAMINE WITH METHYL L-ISOLEUCINE HYDROCHLORIDE 7.5 g. of (S,N-ditrityl L-cysteinyl triethylamine L-tyrosinetriethylamine and 1.7 g. of methyl L-isoleucine hydrochloride, prepared according to Smith, Spackman and Poglasse, J. Biol. Chem., 1952, 199, 803, are dissolved in 30 cc. of methylene chloride, 2.1 g. of dicyclohexylcarbodiimide dissolved in 10 cc. of methylene chloride are added, and the solution is left standing for three hours at room temperature. 2 cc. of glacial acetic acid are added, the solution is left standing at room temperature for thirty minutes and is then filtered, washed with water while adding N-hydrochloric acid until the wash water has a pH of 2. The solution is then washed with plain water, dried over magnesium sulfate and vacuum evaporated to dryness. The residue is taken up with 20 cc. of petroleum ether (30–75° C.). Separating, washing with petroleum ether and drying produces 7.7 g., or a quantitative yield, of (S,N-ditrityl L-cysteinyl) L-tyrosyl methyl L-isoleucinate, XIII. This new compound appears in form of a colorless powder soluble in most organic solvents, insoluble in petroleum ether.

EXAMPLE 10

*Saponification of (S,N-ditrityl L-cysteinyl) L-tyrosyl methyl L-isoleucinate, XIII*

7.7 g. of (S,N-ditrityl L-cysteinyl) L-tyrosyl methyl L-isoleucinate, XIII, prepared according to the preceding example, are dissolved in 30 cc. of hot methanol. 6.2 cc. of 3N potassium hydroxide in methanol and 19.5 cc. of water are added to the solution, which is then heated to boiling for five minutes. After addition of 230 cc. of water and 18 cc. of N-hydrochloric acid, the solution is extracted twice, each time with 300 cc. of ether and the ether extract is dried over magnesium sulfate and vacuum evaporated to dryness.

The residue is taken up with 20 cc. of acetone, filtered and vacuum evaporated to dryness, resulting in an oil which hardens rapidly by trituration under water. Separating, washing with water and vacuum drying produces 5.8 g. or a yield of 76% of (S,N-ditrityl L-cysteinyl) L-tyrosyl L-isoleucine. This new compound appears in form of a white powder that is soluble in alcohol, ether, acetone, benzene and chloroform, insoluble in water. It melts at about 143–145° C., $[\alpha]_D^{20} = +50° \pm 1$ ($c=2\%$, ethanol).

*Analysis.*—$C_{56}H_{55}O_5N_3S=882.08$. Calculated: 76.25% C; 6.28% H; 9.07% O; 4.76% N; 3.63% S. Found: 76.5% C; 6.3% H; 8.7% O; 4.4% N; 3.9% S.

EXAMPLE 11

*Preparation of (S,N-ditrityl L-cysteinyl) methyl L-prolinate, XVI*

(a) PREPARATION OF THE HYDROCHLORIDE OF METHYL L-PROLINATE, XV, ($R=CH_3$)

This compound is prepared according to J. Schumann and R. A. Boissonnas (Helv. Chim. Acta, 1952, 35, 2240) by the action of a stream of dry hydrochloric acid on a suspension of L-proline in methanol. 6 g. of L-proline are introduced into 120 cc. of methanol saturated at 20° C. with dry hydrochloric acid; the solution is left standing at room temperature for 24 hours and is then vacuum evaporated to dryness. This produces 8 g. or a yield of 94% of methyl L-proline hydrochloride in form of a pale yellow oil, which is ready for use in condensation.

(b) CONDENSATION OF S,N-DITRITYL L-CYSTEINE XIV WITH METHYL L-PROLINATE, XV, ($R=CH_3$)

27.5 g. of crystallized S,N-ditrityl L-cysteine diethylamine produced according to Example 7 are dissolved in 150° cc. of chloroform. This solution is washed with 41 cc. of N-hydrochloric acid, then with water, and is dried over sodium sulfate and evaporated to dryness. At the same time, 6.66 g. of methyl L-proline hydrochloride prepared according to (a) are dissolved in 25 cc. of methylene chloride; the solution is cooled to −10° C. and, without permitting the temperature to rise higher than 0° C., 4.8 cc. of diethylamine are added, followed by 200 cc. of ether. Diethylamine hydrochloride, insoluble in ether, precipitates, is filtered off, and the solution of the methyl prolinate is evaporated under vacuum to dryness.

S,N-ditrityl L-systeine, XIV, prepared according to the foregoing description, is dissolved in 50 cc. of methylene chloride. The solution is cooled to 0° C., and methyl L-prolinate, XV, also dissolved in 50 cc. of methylene chloride and cooled to 0° C., is added. 9 g. of dicyclohexylcarbodiimide are introduced into this reaction mixture which is left standing overnight at 20° C. Next day, 1 cc. of acetic acid is added in order to convert dicyclohexylcarbodiimide into dicyclohexylurea. After standing for half an hour, dicyclohexylurea is filtered off and washed with methylene chloride. The filtrate is combined with the wash liquid, is again washed, first with diluted hydrochloric acid, and then with water, and is dried and evaporated to dryness. The ester of the crude dipeptide, XVI, ($R=CH_3$) which is obtained in this manner can be directly saponified to obtain the free dipeptide.

(c) PREPARATION OF HYDROCHLORIDE OF BENZYL L-PROLINATE, XV, ($R=C_6H_5-CH_2-$)

15 g. of L-proline are finely suspended in 150 cc. of pure benzyl alcohol. The suspension is cooled to about +10° C. and, at this temperature, saturated with dry gaseous hydrochloric acid. After standing for some time and heating in vacuo to 90° C. in order to eliminate water that has formed and hydrochloric acid, the solution is cooled and a considerable excess of ether added. Benzyl proline hydrochloride crystallizes and forms small colorless prisms. The mixture is cooled with ice, filtered, and the precipitate washed with ether and dried in vacuo. This produces 31 g. of a white compound $$[\alpha]_D^{20} = -42° \pm 1$$

($c=2\%$, absolute alcohol), identical with the compound described by R. E. Neumann and E. L. Smith (J. Biol Chem., 1951, 193, 97).

(d) CONDENSATION OF S,N-DITRITYLCYSTEINE WITH BENZYL PROLINE HYDROCHLORIDE XV ($R=C_6H_5-CH_2-$)

6.8 g. of S,N-ditritylcysteine diethylamine, produced according to Example 7, and 2.5 g. of benzyl proline hydrochloride dissolved in 50 cc. of methylene chloride are caused to react, overnight, in the presence of 2.2 g. of dicyclohexylcarbodiimide. After a treatment identical to that described at (b), the dipeptide, XVI $$(R=C_6H_5-CH_2-)$$

is isolated in the form of oil.

EXAMPLE 12

*Preparation of (S,N-ditrityl L-cysteinyl) L-proline, XVII*

(a) The methyl ester of the oily, crude dipeptide, XVI, prepared according to Example 11(d), is refluxed with 100 cc. of alcohol, 30 cc. of potassium hydroxide in methanol and 30 cc. of water. After cooling, a mixture of water and ice is added and the pH adjusted to 1 with N-hydrochloric acid (about 90 cc. N–HCl). The precipitate that forms is separated and extracted with chloroform. The chloroform extract is washed with water until neutral, dried and evaporated to dryness. The residue is taken up with 150 cc. of anhydrous ether and refluxed while 5 cc. of diethylamine are added. The solution is allowed to cool, and 2 cc. of water are added. The diethylamine salt of the dipeptide, XVII, crystallizes in needles. Addition of 150 cc. of light petroleum ether and standing at room temperature overnight produces 22 g. of the diethylamine salt of compound XVII, which crystallizes with ½ molecule of water and is sufficiently pure to be used for condensation with methyl leucinate. Yield: 70%, M.P.=about 150° C. (decomp.), $[\alpha]_D^{20}=+92°\pm2$ ($c=2\%$, absolute ethanol).

*Analysis.*—$C_{50}H_{53}O_3N_3S$, $\frac{1}{2}H_2O=785.02$. — Calculated: 76.49% C; 6.93% H; 5.35% N; 4.09% S. Found: 76.4% C; 6.9% H; 5.2% N; 4.2% S.

This product has not been previously described.

(b) The benzyl ester of the dipeptide XVII, the preparation of which has been described in Example 11(d), is saponified by means of refluxing with 6 cc. of 20% potasisum hydroxide in methanol and 6 cc. of water. 50 g. of ice water are added, the solution is acidified with hydrochloric acid to a pH of 2.3, and then extracted with chloroform. The chloroform extract is washed with N/10 hydrochloric acid and water, dried over magnesium sulfate and evaporated to dryness. The residue is taken up with 50 cc. of ether and 2 cc. of diethylamine. Cooling and adding 1 cc. of water produces 5.8 g. of (S,N-ditrityl L-cysteinyl) L-proline diethylamine which crystallizes with ½ molecule of water and is in every way identical with the compound described at the end of (a). Yield: 74%.

EXAMPLE 13

*Preparation of (S,N-ditrityl L-cysteinyl) L-prolyl ethyl L-leucinate, XIX, ($R=C_2H_5$)*

The starting materials used for this preparation are (S,N-ditrityl L-cysteinyl) L-proline, XVII, prepared according to Example 12, and the hydrochloride of ethyl L-leucinate, XVIII, ($R=C_2H_5$) which is prepared according to conventional methods and can be used directly.

15.7 g. of the previously described (S,N-ditrityl L-cysteinyl) L-proline diethylamine are dissolved in 100 cc. of methylene chloride. The solution is dried over magnesium sulfate, and 4.1 g. of ethyl L-leucine hydrochloride are added, followed by 4.5 g. of dicyclohexylcarbodiimide. The solution is left standing for four hours at 25 to 30° C., 1 cc. of acetic acid is added and precipitated dicyclohexylurea is filtered off after one-half hour. The precipitate of dicyclohexylurea is washed with methylene chloride, the wash water is combined with the filtrate, and the mixture is washed with hydrochloric acid and water, dried over magnesium sulfate and evaporated to dryness. The residue consists of the tripeptide ester, XIX, in a sufficiently pure state to permit subsequent saponification.

EXAMPLE 14

*Preparation of S,N-ditrityl L-cysteinyl L-prolyl L-leucine, XX*

The entire amount of the tripeptide ester, XIX, produced according to Example 13, is saponified by boiling with 50 cc. of 95% alcohol and 40 cc. of normal soda. The solution is cooled and poured into ice water, and the resulting precipitate extracted with chloroform. The chloroform extract is washed with N/5 hydrochloric acid and water, dried over magnesium sulfate and evaporated to dryness. The residue is taken up with 20 cc. of ether, to which 200 cc. of light petroleum ether are added. The tripeptide, XX, is recovered in form of a pulverulent compound, soluble in all the usual solvents except petroleum ether. It is sufficiently pure for conversion into the tetrapeptide. The yield is quantitative. M.P.=120° C. (decomp.), $[\alpha]_D^{20}=+80°\pm2$ ($c=2\%$, chloroform).

*Analysis.*—$C_{52}H_{53}O_4N_3S=816.03$. Calculated: 76.53% C; 6.55% H; 7.84% O; 5.15% N; 3.93% S. Found: 76.4% C; 6.5% H; 7.8% O; 5.1% N; 3.9% S.

This compound has not been previously described.

EXAMPLE 15

*Preparation of (S,N-ditrityl L-cysteinyl) L-prolyl L-leucyl methyl glycinate, XXII, ($R=-CH_3$)*

8.25 g. of (S,N-ditrityl L-cysteinyl) L-prolyl L-leucine, produced according to Example 14, are introduced into a solution previously cooled to 0° C. and consisting of 1.5 g. of the hydrochloride of methyl glycinate, XXI, in 50 cc. of methylene chloride and 1.3 cc. of diethylamine. 2.3 g. of dicyclohexylcarbodiimide are added to this solution which is left standing for three hours at 25–30° C. After cooling to about 18° C., adding 0.5 cc. of acetic acid and standing for half an hour, the solution is filtered. The filtrate is washed with hydrochloric acid and water, dried over magnesium sulfate and vacuum evaporated to dryness. The residue is taken up with 50 cc. of ether from which the methyl ester of the tetrapeptide, XXII, crystallizes in form of colorless leaves (6 g.). Yield: 68%. Recrystallized in alcohol, the product appears in form of large, colorless prisms, M.P.=about 130° C. (decomp.), $[\alpha]_D^{20}=+112°\pm2$ ($c=2\%$, chloroform), soluble in chloroform and hot ethanol, sparingly soluble in acetone, insoluble in ether and water.

*Analysis.*—$C_{55}H_{58}O_5N_4S=887.11$. Calculated: 74.46% C; 6.59% H; 6.32% N; 3.6% S. Found: 74.3% C; 6.7% H; 6.3% N; 3.7% S.

This compound has not been previously described.

EXAMPLE 16

*Selective detritylation at the nitrogen of (S,N-ditrityl L-cysteinyl) L-prolyl L-leucyl methyl glycinate, XXII, by means of hydrochloric acetone and preparation of (S-trityl L-cysteinyl) L-prolyl L-leucyl methyl glycinate, XXIII, ($R=-CH_3$)*

4.4 g. of the methyl ester XXII are suspended in 20 cc. of acetone, 5 cc. of 5N hydrochloric acid are added, and the solution is left standing for 20 minutes at 35° C. After adding 60 cc. of water, the solution is extracted with chloroform. The chloroform extracts are combined and washed with hydrochloric acid, dried over magnesium sulfate and vacuum evaporated to dryness. The oily residue, taken up with ether, solidifies and yields 3.2 g. of the hydrochloride of S-tritylated tetrapeptide, XXIII, ($R=-CH_3$) which is a new compound; yield: 94%, M.P.=about 150° C., $[\alpha]_D^{20}=-17°\pm1$ ($c=2\%$, chloroform), soluble in chloroform, benzene, acetone and water, insoluble in ether and diluted acids.

*Analysis.*—$C_{36}H_{45}O_5N_4SCl=681.28$. Calculated: 63.46% C; 6.66% H; 8.22% N; 4.7% S; 11.74% O; 5.21% Cl. Found: 63.4% C; 6.8% H; 8.3% N; 4.8% S; 11.7% O; 5.1% Cl.

EXAMPLE 17

*Preparation of (S,N-ditrityl L-cysteinyl) L-prolyl L-leucyl glycine, XXII, ($R=H$)*

2 g. of the methyl ester of tetrapeptide XXII ($R=-CH_3$) are saponified by refluxing with 20 cc. of methanol and 10 cc. of N/2 sodium hydroxide. After cooling and adding ice water, the solution is acidified to a pH of 1 to 2 by means of N-hydrochloric acid, and is extracted with chloroform. The chloroform extract is washed with water until neutral, dried over magnesium sulfate and evaporated to dryness. Taken up with benzene, product XXII ($R=H$) crystallizes in fine, colorless needles: 1.65 g. are obtained (yield: 80%). M.P.=135–140° C., then 190° C., $[\alpha]_D^{20}=+115°\pm2$ ($c=2\%$, chloroform). This new compound which includes ½ molecule of solvation benzene is soluble in acetone, alcohol and chloroform, very sparingly soluble in benzene, insoluble in water and ether.

*Analysis:*—$C_{54}H_{56}O_5N_4S$, $1/2$ $C_6H_6=912.13$. Calculated: 75.05% C; 6.52% H; 8.77% O; 6.14% N; 3.51% S. Found: 75.1% C; 6.4% H; 9.0% O; 5.9% N; 3.6% S.

EXAMPLE 18

*Selective detritylation at the nitrogen of (S,N-ditrityl L-cysteinyl) L-prolyl L-leucyl glycine, XXII, ($R=H$) with hydrochloric acetone and preparation of (S-trityl L-cysteinyl) L-prolyl L-leucyl glycine, XXIII, ($R=H$)*

Following the procedure indicated in Example 16, but neutralizing with sodium acetate prior to the chloroform extraction of the peptide detritylated at the nitrogen, from 1.5 g. of compound XXII (R=H), 1 g. of detritylated peptide, or a yield of 95%, is obtained after the ether treatment. When recrystallized in ethanol-ether, the product appears in form of needles, $[\alpha]_D^{20}=-28°\pm2$ ($c=2\%$, absolute ethanol), containing ½ molecule of water of crystallization. It is soluble in diluted aqueous acids and alkalies and in hot alcohol, sparingly soluble in chloroform, insoluble in water and ether.

Analysis.—$C_{35}H_{42}O_5N_4S$, ½$H_2O$=639.8. Calculated: 65.70% C; 6.77% H, 13.75% O; 8.76% N, 5.01% S. Found: 65.9% C; 6.8% H; 14.0% O; 8.8% N; 5.1% S.

EXAMPLE 19

*Preparation of (N-trityl γ-methyl L-glutamyl) (β-methyl L-aspartyl) (S-trityl L-cysteinyl) L-prolyl L-leucyl methyl glycinate, XXIV*

3.55 g. of the hydrochloride of (S-trityl L-cysteinyl) L-prolyl L-leucyl methyl glycinate, XXIII, prepared according to example 16, and 3.1 g. of diethylamine salt of (N-trityl γ-methyl L-glutamyl) β-methyl L-aspartic acid, VII, prepared according to Example 6, are dissolved in 10 cc. of methylene chloride. The solution is dried over sodium sulfate, and 1.15 g. of dicyclohexylcarbodiimide are added to the filtered solution which is left standing overnight at room temperature. The solution is then filtered, washed with 10 cc. of 0.1N hydrochloric acid, 10 cc. of water, 5 cc. of a 10% sodium carbonate solution, and again with 10 cc. of water, and is dried over sodium sulfate and vacuum evaporated to dryness. The residue is dissolved in 2 cc. of absolute alcohol heated to 35° C., 20 cc. of ether heated to the same temperature are added, the solution is left standing at room temperature for one hour, another 20 cc. of ether are added, the solution is again left standing, first at laboratory temperature for one hour, then in an iced water bath for one hour, and is subsequently separated, washed with ether and dried. This produces 4.2 g. (72%) of (N-trityl γ-methyl L-glutamyl) (β-methyl L-aspartyl) (S-trityl L-cysteinyl) L-prolyl L-leucyl methyl glycinate, XXIV, M.P.=about 130° C., $[\alpha]_D^{20}=-26°\pm1$ ($c=2\%$, chloroform).

This compound, which has not been hitherto described, appears in form of fine, colorless needles insoluble in water and ether, soluble in alcohol, acetone, benzene and chloroform.

Analysis.—$C_{66}H_{74}O_{11}N_6S$=1,159.4. Calculated: 68.37% C; 6.43% H; 15.18% O; 7.25% N; 2.76% S. Found: 68.4% C; 6.4% H; 15.0% O; 7.3% N; 2.8% S.

EXAMPLE 20

*Preparation of hydrochloride of (γ-methyl L-glutamyl) (β-methyl L-aspartyl) (S-trityl L-cysteinyl) L-prolyl L-leucyl methyl glycinate, XXV*

4 g. of (N-trityl γ-methyl L-glutamyl) (β-methyl L-aspartyl) (S-trityl L-cysteinyl) L-prolyl L-leucyl methyl glycinate, XXIV, prepared according to the preceding example, are dissolved in 8 cc. of acetone, 4 cc. of 5N hydrochloric acid are added to the solution which is left standing at room temperature for 15 minutes and is then extracted with 40 cc. of chloroform. The organic solution obtained in this manner is washed with 8 cc. of N-hydrochloric acid and is dried over sodium sulfate and concentrated to 5 cc. After adding 80 cc. of ether, the solution is separated and dried and yields, after recrystallization in 50 cc. of a chloroform-ether mixture (1:5), 3.1 g. (94%) of the hydrochloride of (γ-methyl L-glutamyl) (β-methyl L-aspartyl) (S-trityl L-cysteinyl) L-prolyl L-leucyl methyl glycinate, XXV, M.P.=about 125° C., $[\alpha]_D^{20}=-30°\pm1$ ($c=2\%$, chloroform). This new compound is insoluble in ether and benzene, sparingly soluble in water, soluble in alcohol, acetone and chloroform.

Analysis.—$C_{47}H_{60}O_{11}N_6S \cdot HCl$=953.54. Calculated: 59.2% C; 6.45% H; 8.81% N; 3.36% S; 3.72% Cl. Found: 59.5% C; 6.4% H; 8.7% N; 3.8% S; 3.6% Cl.

EXAMPLE 21

*Preparation of (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate, XXVI*

4 g. of (S,N-ditrityl L-cysteinyl) L-tyrosyl L-isoleucine, XIIIa, prepared according to Example 10 are dissolved in 5 cc. of ethyl acetate, diluted with 40 cc. of ether. 0.8 cc. of diethylamine dissolved in 10 cc. of ether are then added to the solution which is separated, washed with ether and dried. 3 g. of the resulting diethylamine salt are taken up with 10 cc. of methylene chloride and 2.95 g. of the hydrochloride of (γ-methyl L-glutamyl) (β-methyl L-aspartyl) (S-trityl L-cysteinyl) L-prolyl L-leucyl methyl glycinate, XXV, produced according to the preceding example, and 750 mg. of dicyclohexylcarbodiimide are then added to the solution. After standing overnight at room temperature, the solution is filtered and washed, first with 20 cc. of water containing 1.5 cc. of N-hydrochloric acid, then with 10 cc. of water, dried over sodium sulfate and vacuum evaporated to dryness. The residue is dissolved in 3 cc. of ethyl acetate and, after adding 60 cc. of ether, the solution is separated, washed with ether, 50% alcohol, 25% alcohol, and water and is dried at 50° C. to yield 3.7 g. (69%) of (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate, XXVI, M.P.=about 120° C., $[\alpha]_D^{20}=0°\pm1$ ($c=2\%$, chloroform).

This compound, which has not been hitherto described, is insoluble in water, very sparingly soluble in ether, sparingly soluble in benzene, soluble in alcohol, acetone and chloroform.

Analysis. — $C_{103}H_{113}O_{15}N_9S_2$=1,781.4. Calculated: 69.45% C; 6.39% H; 13.47% O; 7.08% N; 3.60% S. Found: 69.4% C; 6.2% H; 13.3% O; 7.1% N; 4.0% S.

EXAMPLE 22

*Ammoniolysis of (S,N-ditrityl L-cysteinyl) L-tyrosyl L-isoleucyl (γ-methyl L-glutamyl) (β-methyl L-aspartyl) (S-trityl L-cysteinyl) L-prolyl methyl glycinate, XXVI*

I. WITH AMMONIA IN METHANOL SOLUTION 9 g. of (S,N-ditrityl L-cysteinyl) L-tyrosyl L-isoleucyl (γ-methyl L-glutamyl) (β-methyl L-aspartyl) (S-trityl L-cysteinyl L-prolyl L-leucyl methyl glycinate, XXVI, prepared according to the preceding example, are dissolved in 90 cc. of methanol, and the solution is saturated with ammonia gas at the temperature of −20° C. The reaction vessel is sealed and left standing at 20° C. for three days. After eliminating ammonia by evaporating in the cold under reduced pressure to dryness, the residue is taken up with 80 cc. of ether. The solution is separated, air dried and redissolved in 50 cc. of chloroform. The chloroform solution is first washed with very diluted hydrochloric acid and water and is then concentrated to one-half of the initial volume. Addition of 200 cc. of petroleum ether yields 8.2 g. of the crude produce which is recrystallized by means of dissolving in 10 volumes of 50° C. isopropanol and cooling to 0° C. This produces 6.15 g. of (S,N-ditrityl L-cysteinyl) L-tyrosyl L-isoleucyl L-glutaminyl L-asparaginyl (S-trityl L-cysteinyl) L-prolyl L-leucyl glycinamide, XXVII, or a yield of 70%. This new compound appears in form of a white powder, $[\alpha]_D^{20}=+5°$ ($c=2\%$, chloroform), soluble in chloroform, methylene chloride, methanol, alcohol, insoluble in water, ether, benzene and petroleum ether.

*Analysis.* — $C_{100}H_{110}O_{12}N_{12}S_2 = 1,736.1$. Calculated: 9.7% total N; 2.4% amine N. Found: 9.6% total N; 2.2% amine N.

II. WITH AMMONIA IN HYDRO-METHANOL SOLUTION 1 g. of the tritritylated nonapeptide triester, XXVI, is dissolved in 22 cc. of 90% methanol, the solution is saturated at −15° C. with ammonia gas, the reaction vessel is sealed and left standing at room temperature for 24 hours. The solution is then vacuum evaporated to dryness, the residue taken up with ether, separated, washed with ether and air dried. This produces 0.8 g. of a crude product which, upon crystallization according to method I, yields pure (S,N-ditrityl L-cysteinyl) L-tyrosyl L-isoleucyl L-glutaminyl L-asparaginyl (S-trityl L-cysteinyl) L-prolyl L-leucyl glycinamide, XXVII.

III. WITH LIQUID AMMONIA 0.5 g. of the tritritylated nonapeptide triester, XXVI, are dissolved in 15 cc. of liquid ammonia of 60° C. The vessel is sealed and left standing at room temperature. After 20 hours, the vessel is cooled to −60° C. and opened, and the content vacuum evaporated to dryness. The residue is taken up with ether, separated and dried. This produces 0.44 g. of a crude product which, upon crystallization in isopropanol according to method I, yields (S,N-ditrityl L-cysteinyl) L-tyrosyl L-isoleucyl L-glutaminyl L-asparaginyl (S-trityl L-cysteinyl) L-prolyl L-leucyl glycinamide, XXVII.

EXAMPLE 23

*Selective detritylation at the nitrogen of (S,N-ditrityl L-cysteinyl) L-tyrosyl L-isoleucyl L-glutaminyl L-asparaginyl (S-trityl L-cysteinyl) L-prolyl L-leucyl glycinamide*

0.2 g. of the tritritylated nonapeptide triamide, XXVII, prepared according to one of the methods of the preceding example, are dissolved in 0.5 cc. of glacial acetic acid. 0.1 cc. of 5 N hydrochloric acid are added and, after several minutes, 20 cc. of water. The reaction mixture is then extracted with methylene chloride and the extract, after washing with water and diluted ammonia, is dried over sodium sulfate and vacuum concentrated to a small volume. After diluting the concentrate with 10 volumes of ether, the solution is separated, washed with ether and dried, to produce 0.17 g. of (S-trityl L-cysteinyl) L-tyrosyl L-isoleucyl L-glutaminyl L-asparaginyl (S-trityl L-cysteinyl) L-prolyl L-leucyl glycinamide, XXVIII. The yield is quantitative. This new product appears in form of a white powder, soluble in chloroform, methylene chloride and acetic acid, insoluble in water, ether and petroleum ether.

*Analysis.* — $C_{81}H_{96}O_{12}N_{12}S_2 = 1,493.8$. Calculated: 65.1% C; 6.5% H; 11.25% N; 4.3% S. Found: 65.3% C; 6.5% H; 11.0% N; 4.3% S.

EXAMPLE 24

*Complete detritylation of (S,N-ditrityl L-cysteinyl) L-tyrosyl L-isoleucyl L-glutaminyl L-asparaginyl (S-trityl L-cysteinyl) L-prolyl L-leucyl glycinamide*

I. WITH GASEOUS HYDROCHLORIC ACID IN ANHYDROUS CHLOROFORM 0.173 g. of tritritylated nonapeptide triamide, XXVII, prepared according to Example 22, are dissolved in 17 cc. of anhydrous chloroform. The solution is saturated with a stream of dry gaseous hydrochloric acid and, after standing for five minutes, the resulting precipitate is separated, washed with ether and dissolved in 5 cc. of ice water. The pH of the aqueous solution is adjusted to between 6 and 7 by shaking with a small amount of ion exchange resin "Amberlite IR 4B." The resin is filtered off and washed with 5 cc. of water which is added to the main solution. This produces 10 cc. of a solution containing 0.1 g. of L-cysteinyl L-tyrosyl L-isoleucyl L-glutaminyl L-asparaginyl L-cysteinyl L-prolyl L-leucyl glycinamide, XXIX, which can be oxidized directly into the hormonal nonapeptide compound of du Vigneaud.

II. WITH GASEOUS HYDROCHLORIC ACID IN ACETIC CHLOROFORM

The method of the preceding example is repeated by dissolving 0.173 g. of the tritritylated nonapeptide triamide, XXVII, in 1.7 cc. of chloroform and 0.8 cc. of glacial acetic acid.

III. WITH GASEOUS HYDROCHLORIC ACID IN METHYLENE CHLORIDE, IN THE PRESENCE OF THIOGLYCOLIC ACID

Following the method of Example 24, I, 0.173 g. of tritritylated nonapeptide triamide, XXVII, dissolved in 17 cc. of methylene chloride containing 0.5 cc. of thioglycolic acid is used as starting material.

IV. WITH AQUEOUS HYDROCHLORIC ACID, IN METHYLENE CHLORIDE 0.2 g. of tritritylated nonapeptide triamide, XXVII, are dissolved in 5 cc. of methylene chloride, and the resulting solution is shaken for 15 minutes with 1 cc. of 10N aqueous hydrochloric acid. 50 cc. of water are added, the organic phase is removed and the aqueous phase washed with methylene chloride. Adjusting the pH to between 6 and 7 by shaking with a small amount of ion exchange resin "Amberlite IR 4B," filtering and making up to 100 cc. produces a solution containing L-cysteinyl L-tyrosyl L-isoleucyl L-glutaminyl L-asparaginyl L-cysteinyl L-prolyl L-leucyl glycinamide XXIX which can be directly oxidized to yield the hormonal nonapeptide compound of du Vigneaud.

EXAMPLE 25

*Detritylation of (S-trityl L-cysteinyl) L-tyrosyl L-isoleucyl L-glutaminyl L-asparaginyl (S-trityl L-cysteinyl) L-prolyl L-leucyl glycinamide*

The method of Example 24, I, II, III, or IV is followed in treating the S-ditrityl compound with gaseous hydrochloric acid in anhydrous chloroform, with gaseous hydrochloric acid in acetic chloroform, with gaseous hydrochloric acid in methylene chloride in the presence or absence of thioglycolic acid, or with aqueous hydrochloric acid in methylene chloride, whereby an aqueous solution of the free nonapeptide triamide XXIX is produced which can be directly oxidized to the hormonal nonapeptide compound of du Vigneaud.

EXAMPLE 26

*Oxidation of L-cysteinyl L-tyrosyl L-isoleucyl L-glutaminyl L-asparaginyl L-cysteinyl L-prolyl L-leucyl glycinamide, XXIX*

An aqueous solution of the free nonapeptide triamide, XXIX, produced according to one of the preceding Examples 24, I, II, III, IV or 25, is agitated under an atmosphere of oxygen until a test sample gives a negative color reaction upon addition of sodium nitroprusside and ammonia. The resulting solution shows strong oxytocic activity upon measuring, according to Coon, the blood pressure reduction in the chicken, Arch, Intern, Pharmacodynamie, 1939, 62, 79; U.S. Pharmacopeia, 15th ed., 1955, p. 494.

EXAMPLE 27

*Complete detritylation of (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate, XXVI*

Detritylations are carried out as in Example 24, I, II, III, or IV. The aqueous solutions thus obtained are adjusted to a pH between 6 and 7 by shaking with ion exchange resin IR 4B. The solutions contain L-cysteinyl L-tyrosyl L-isoleucyl (γ-methyl L-glutamyl) (β-methyl L-aspartyl) L-cysteinyl L-prolyl L-leucyl methyl glycinate.

EXAMPLE 28

*Oxidation and ammoniolysis of L-cysteinyl L-tyrosyl L-isoleucyl (γ-methyl L-glutamyl) (β-methyl L-aspartyl) L-cysteinyl L-prolyl L-leucyl methyl glycinate*

One of the aqueous solutions produced according to the preceding example is directly oxidized according to Example 26 to form a cyclic nonapeptide triester. The solution is saturated with ammonia at 0° C., the vessel is hermetically sealed and is left standing for two days at 20° C. The ammonia is removed in vacuo at room temperature, and the pH adjusted to 6 by means of acetic acid. The resulting solution shows strong oxytocic activity, identical with that of Example 26.

The foregoing examples have been presented to illustrate the present invention, but not to limit the same in any manner. Thus, racemic or enantiomorphous amino acids may be used as starting materials, other amino acid esters than those mentioned may be used, or such esters may be made by different methods than those described. In addition, it is not intended to restrict the invention to any particular operating temperatures or methods of saponification. Similarly, other substituted carbodiimides than dicyclohexylcarbodiimide may be used as condensing agents and other known methods of condensing peptides may be applied without exceeding the scope of this invention which is also not restricted to any particular methods of ammoniolysis or detritylation.

We claim:

1. In a process of producing oxytocin, the steps which comprise:

(a) adding dicyclohexyl carbodiimide to a solution of the α-benzyl-L-aspartic acid-β-lower alkyl ester in methylene chloride, cooling the mixture to about 0° C., adding thereto the N-trityl glutamic acid-γ-lower alkyl ester, allowing the mixture to stand at room temperature to complete condensation, acidifying the reaction mixture with acetic acid, filtering off precipitated dicyclohexyl urea, and separating the resulting (N-trityl-γ-lower alkyl-L-glutamyl)-α-benzyl-L-aspartic acid-β-lower alkyl ester;

(b) dissolving said (N-trityl-γ-lower alkyl-L-glutamyl)-α-benzyl-L-aspartic acid-β-lower alkyl ester in ethanol, adding triethylamine and palladium black to said solution, introducing hydrogen at room temperature thereinto to split off the benzyl group, and separating the (N-trityl-γ-lower alkyl-L-glutamyl)-L-aspartic acid-β-lower alkyl ester;

(c) adding dicyclohexyl carbodiimide to a solution of the diethylamine salt of S,N-ditrityl-L-cysteine and the hydrochloride of the lower alkyl ester of L-tyrosine in methylene chloride, allowing the mixture to stand at a temperature between room temperature and about 35° C. to complete condensation, acidifying the reaction mixture with acetic acid, filtering off precipitated dicyclohexyl urea, and separating the resulting lower alkyl ester of S,N-ditrityl-L-cysteinyl-L-tyrosine;

(d) refluxing the aqueous alcoholic solution of said ester with an alcoholic alkali metal hydroxide solution to saponify the lower alkyl ester group, neutralizing the saponification mixture by the addition of hydrochloric acid, extracting the neutralized mixture with ether, and separating the resulting (S,N-ditrityl-L-cysteinyl)-L-tyrosine;

(e) adding triethylamine to a solution of said S,N-ditrityl compound in chloroform, and precipitating the triethylamine salt of (S,N-ditrityl-L-cysteinyl)-L-tyrosine by the addition of petroleum ether;

(f) adding dicyclohexyl carbodiimide to a solution of said triethylamine salt of (S,N-ditrityl-L-cysteinyl)-L-tyrosine and the hydrochloride of the lower alkyl ester of L-isoleucine in methylene chloride, allowing the mixture to stand at room temperature to complete condensation, acidifying the reaction mixture with acetic acid, filtering off precipitated dicyclohexyl urea, and separating the resulting (S,N-ditrityl-L-cysteinyl)-L-tyrosyl-L-isoleucine lower alkyl ester;

(g) refluxing the aqueous alcoholic solution of said ester with an alcoholic alkali metal hydroxide solution to saponify the lower alkyl ester group, neutralizing the saponification mixture by the addition of hydrochloric acid, extracting the neutralized mixture with ether, and separating the resulting (S,N-ditrityl-L-cysteinyl)-L-tyrosine-L-isoleucine;

(h) adding dicyclohexyl carbodiimide to a solution of the diethylamine salt of S,N-ditrityl-L-cysteine and the hydrochloride of benzyl-L-proline in methylene chloride, allowing the mixture to stand at about room temperature to complete condensation, acidifying the reaction mixture with acetic acid, filtering off precipitated dicyclohexyl urea, and separating the resulting (S,N-ditrityl-L-cysteinyl)-L-proline benzyl ester;

(i) refluxing said benzyl ester with an aqueous alcoholic alkali metal hydroxide solution to saponify the benzyl ester group, neutralizing the saponification mixture by the addition of hydrochloric acid, extracting the neutralized mixture with chloroform, and separating the resulting (S,N-ditrityl-L-cysteinyl)-L-proline;

(j) adding diethylamine to a solution of said dipeptide compound in ether to yield the diethylamine salt of (S,N-ditrityl-L-cysteinyl)-L-proline;

(k) adding dicyclohexyl carbodiimide to a solution of the diethylamine salt of (S,N-ditrityl-L-cysteinyl)-L-proline and the hydrochloride of the L-leucine lower alkyl ester in methylene chloride, allowing the mixture to stand at a temperature between about 25° C. and about 30° C. to complete condensation, acidifying the reaction mixture with acetic acid, filtering off precipitated dicyclohexyl urea, and separating the resulting (S,N-ditrityl-L-cysteinyl)-L-prolyl-L-leucine lower alkyl ester;

(l) refluxing said lower alkyl ester with an aqueous alcoholic alkali metal hydroxide solution to saponify the lower alkyl ester group, neutralizing the saponification mixture by the addition of hydrochloric acid, extracting the neutralized mixture with ether, and separating the resulting S,N-ditrityl-L-cysteinyl-L-prolyl-L-leucine;

(m) adding dicyclohexyl carbodiimide to a solution of the diethylamine salt of S,N-ditrityl-L-cysteinyl-L-prolyl-L-leucine and the hydrochloride of the glycine lower alkyl ester in methylene chloride, allowing the mixture to stand at a temperature between about 25° C. and about 30° C. to complete condensation, acidifying the reaction mixture with acetic acid, filtering off precipitated dicyclohexyl urea, and separating the resulting (S,N-ditrityl-L-cysteinyl)-L-prolyl-L-leucyl-glycine lower alkyl ester;

(n) adding aqueous hydrochloric acid to a mixture of said lower alkyl ester in a solvent selected from the group consisting of acetone and acetic acid, allowing the mixture to stand at a temperature of about 35° C. to complete selective detritylation of the N-trityl group, and separating the resulting (S-trityl-L-cysteinyl)-L-prolyl-L-leucyl glycine lower alkyl ester;

(o) adding dicyclohexyl carbodiimide to a solution of the diethylamine salt of the (N-trityl-γ-lower alkyl-L-glutamyl)-L-aspartic acid-β-lower alkyl ester obtained according to step (b) and the hydrochloride of the (S-trityl-L-cysteinyl)-L-prolyl-L-leucyl glycine lower alkyl ester in methylene chloride, allowing the mixture to stand at about room temperature to complete condensation, filtering off precipitated dicyclohexyl urea, and separating the resulting (N-trityl-γ-lower alkyl-L-glutamyl)-(β-lower alkyl - L - aspartyl) - (S - trityl - L - cysteinyl) - L - prolyl-L-leucyl glycine lower alkyl ester;

(p) adding aqueous hydrochloric acid to a mixture of said lower alkyl ester in a solvent selected from the group consisting of acetone and acetic acid, allowing the mixture to stand at room temperature to complete selective detritylation of the N-trityl group, and separating the resulting hexapeptide compound (γ-lower alkyl-L-glutamyl)-(β-lower alkyl-L-aspartyl)-(S-trityl-L-cysteinyl)-L-prolyl-L-leucyl glycine lower alkyl ester;

(q) adding dicyclohexyl carbodiimide to a solution of the diethylamine salt of (S,N-ditrityl-L-cysteinyl)-L-tyrosyl-L-isoleucine obtained according to step (g) and the hydrochloride of (γ-lower alkyl-L-glutamyl)-(β-lower alkyl-L-aspartyl)-(S-trityl-L-cysteinyl)-L-prolyl-L-leucyl glycine lower alkyl ester in methylene chloride, allowing the mixture to stand at about room temperature to complete condensation, filtering off precipitated dicyclohexyl urea, and separating the resulting (S,N-ditrityl-L-cysteinyl)-L-tyrosyl-L-isoleucyl-(γ-lower alkyl-L-glutamyl)-(β-lower alkyl-L-aspartyl)-(S-trityl-L-cysteinyl)-L-prolyl-L-leucyl glycine lower alkyl ester;

(r) dissolving said lower alkyl ester in a lower alkanol, saturating the resulting solution at a temperature of about −15° C. to −20° C. with ammonia gas, allowing the mixture to stand in a sealed container at room temperature to complete replacement of the lower alkyl ester group by the amide group, and separating the resulting triamide (S,N-ditrityl-L-cysteinyl)-L-tyrosyl-L-isoleucyl-L-glutaminyl-L-asparaginyl-(S-trityl-L-cysteinyl)-L-prolyl-L-leucyl glycine amide;

(s) dissolving said triamide in an anhydrous solvent selected from the group consisting of chloroform, a mixture of chloroform and acetic acid, and a mixture of methylene chloride and thioglycolic acid, saturating the solution with gaseous hydrochloric acid at room temperature to complete detritylation, and separating the resulting L-cysteinyl-L-tyrosyl-L-isoleucyl-L-glutaminyl-L-asparaginyl-L-cysteinyl-L-prolyl-L-leucyl glycine amide; and (t) dissolving said nonapeptide triamide in water and agitating the solution in oxygen to cause conversion thereof into oxytocin.

2. The process according to claim 1, wherein the α-benzyl-L-aspartic acid-β-lower alkyl ester used as the one reaction component in step (a) is obtained by adding triphenyl methyl chloride and triethylamine to a solution of the dibenzyl ester of L-aspartic acid, allowing the mixture to stand at room temperature to complete N-tritylation, separating the resulting N-trityl-L-aspartic acid dibenzyl ester, dissolving said ester in a mixture of dioxane and a lower alkanol, adding thereto a solution of an alkali metal lower alkanolate in a lower alkanol, separating the resulting N-trityl-L-aspartic acid-α-benzyl-β-lower alkyl diester, dissolving said diester in chloroform, saturating said solution with gaseous hydrochloric acid, and separating the resulting α-benzyl-β-lower alkyl diester of L-aspartic acid.

3. The process according to claim 1, wherein step (s) is carried out by dissolving (S,N-ditrityl-L-cysteinyl)-L-tyrosyl-L-isoleucyl-L-glutaminyl-L-asparaginyl-(S-trityl-L-cysteinyl)-L-prolyl-L-leucyl glycinamide in methylene chloride and shaking the solution with aqueous hydrochloric acid to cause complete detritylation of said tritritylated nonapeptide triamide.

4. The process according to claim 1, wherein step (r) is carried out by dissolving the (S,N-ditrityl-L-cysteinyl)-L-tyrosyl-L-isoleucyl-(γ-lower alkyl-L-glutamyl)-(β-lower alkyl-L-aspartyl)-(S-trityl-L-cysteinyl)-L-prolyl-L-leucyl glycine lower alkyl ester at about −60° C. in liquid ammonia and the mixture is allowed to stand in a sealed container at room temperature to complete replacement of the lower alkyl ester groups by the amide groups.

5. The method according to claim 1, wherein the peptide condensations are carried out with a 10 to 30% excess of dicyclohexylcarbodiimide.

6. The method according to claim 1, wherein said aqueous solution of the free nonapeptide triamide prior to shaking in an atmosphere of oxygen is shaken with an acid-adsorbing ion exchange resin until the solution has a pH of 6–7.

7. A member of the group of polypeptide derivatives consisting of N-trityl γ-lower alkyl glutamyl β-lower alkyl aspartate, N-trityl γ-lower alkyl glutamyl α-benzyl β-lower alkyl aspartate, S,N-ditrityl L-cysteinyl lower alkyl tyrosinate, S,N-ditrityl L-cysteinyl tyrosine, S,N-ditrityl L-cysteinyl L-tyrosyl lower alkyl L-isoleucinate, S,N-ditrityl L-cysteinyl L-proline and lower alkanoyl esters thereof, S,N-ditrityl L-cysteinyl L-prolyl L-leucine and lower alkanoyl esters thereof, S,N-ditrityl L-cysteinyl L-prolyl L-leucyl glycine and lower alkanoyl esters thereof, S-trityl L-cysteinyl L-prolyl L-leucyl glycine and lower alkanoyl esters thereof, (N-trityl γ-lower alkyl L-glutamyl) (β-lower alkyl L-aspartyl) (S-trityl L-cysteinyl) L-prolyl L-leucyl lower alkyl glycinate, (S,N-ditrityl L-cysteinyl) L-tyrosyl L-isoleucyl (γ-lower alkyl L-glutamyl) (β-lower alkyl L-aspartyl) (S-trityl L-cysteinyl) L-prolyl L-leucyl glycinate, salts with hydrochloric acid and organic bases of said esters, (S,N-ditrityl and S-trityl) L-tyrosyl L-isoleucyl L-glutaminyl L-asparaginyl (S-trityl L-cysteinyl) L-prolyl L-leucyl glycinamide and cyclic L-cysteinyl L-tyrosyl L-isoleucyl (γ-lower alkyl L-glutamyl) (β-lower alkyl L-aspartyl) L-cysteinyl L-prolyl L-leucyl lower alkyl glycinate wherein the two cysteine groups are present in the form of cystine.

8. N-trityl γ-methyl glutamyl β-methyl aspartate.

9. S,N-ditrityl L-cysteinyl L-tyrosyl L-isoleucine.

10. The methyl ester of S-trityl L-cysteinyl L-prolyl L-leucyl glycine.

11. (N-trityl γ-methyl L-glutamyl) (β-methyl L-aspartyl) (S-trityl L-cysteinyl) L-prolyl L-leucyl methyl glycinate.

12. (S,N-ditrityl L-cysteinyl) L-tyrosyl L-isoleucyl (γ-methyl L-glutamyl) (β-methyl L-aspartyl) (S-trityl L-cysteinyl) L-prolyl L-leucyl methyl glycinate.

References Cited in the file of this patent

Du Vigneaud et al.: J. Am. Chem. Soc. (1954), 76, 3115.

Helferich et al.: Ber. Deut. Chem., vol. 58, p. 885 (1925).